Patented Sept. 30, 1952

2,612,148

UNITED STATES PATENT OFFICE 2,612,148

DRIVING UNIT FOR MOTOR VEHICLES

Philip Conrad Vincent, Stevenage, England, assignor to Vincent "H. R. D." Company Limited, Stevenage, England, a British company Application July 11, 1947, Serial No. 760,336
In Great Britain November 15, 1943

Section 1, Public Law 690, August 8, 1946
Patent expires November 15, 1963

5 Claims. (Cl. 123—41.31)

This invention relates to a driving unit for a motor vehicle of the kind in which the engine and axle assemblage are constructed as a self-contained unit with driving gear between the engine and the axle.

According to this invention, a driving unit of the kind referred to is characterised in that there is provided a ventilated compartment in or on said unit for housing one or more engine auxiliaries and forming a protection against dirt and moisture. Preferably, the compartment is formed as a part of the engine casing.

A fan may be provided for causing a flow of air through said compartment.

A heat exchanger may be arranged in the axle casing and said fan may be arranged to cause a flow of air through said heat exchanger.

The low pressure side of the fan may be arranged to communicate with said compartment and the high pressure side with said heat exchanger. The compartment may be provided with an inlet opening with which is associated an air filter.

The axle casing may be formed in two parts, one or both of which houses said heat exchanger, which casings are secured on either side of the main casting which incorporates the engine cylinders. One or both of said axle casings, in addition to housing said heat exchanger, may also house a fan or fans. In any of the arrangements referred to above, the engine carburettor and/or ignition components may be housed in said compartment and are thus protected from dirt and moisture.

Figure 1:
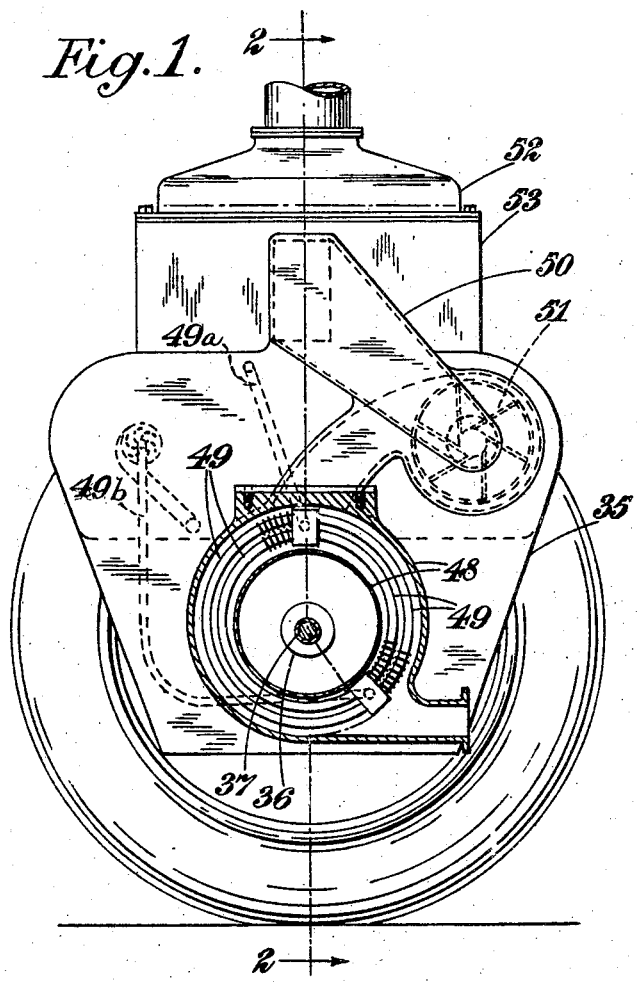
Figure 2:
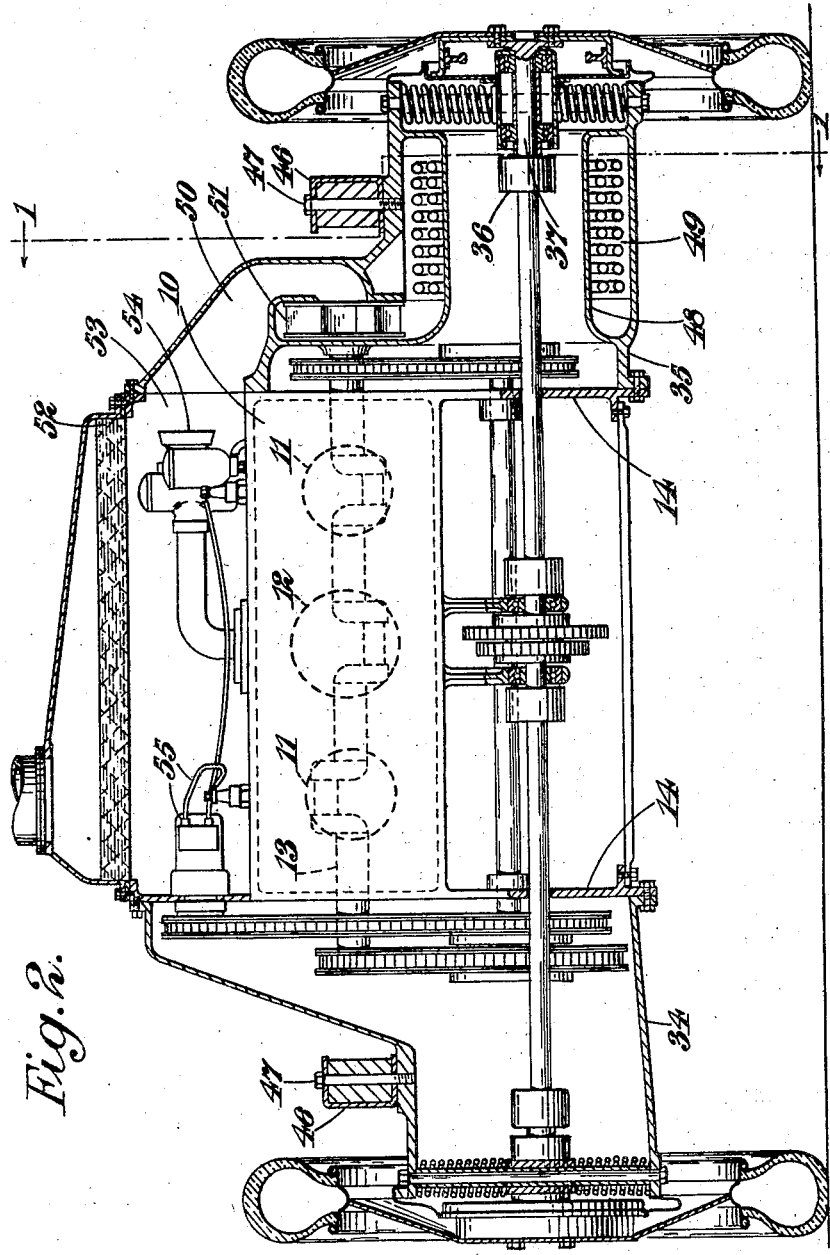

The following is a description of one embodiment of the invention, reference being made to the accompanying drawings, in which:

Figure 1 is a side view of the engine axle unit, one of the road-wheels being removed, and Figure 2 is a section on the line 2—2 of Figure 1.

Referring to the arrangement shown in Figures 1 and 2, the engine employed is similar to that described in prior British Patents Nos. 555,974 and 567,646, and comprises a cylinder block 10 having two working cylinders 11 arranged with their axes extending in a fore-and-aft direction with respect to the vehicle, and a pump cylinder 12 disposed between them. Two crankshafts 13 are provided, one at either end of the cylinders. Bolted to the two sides of the cylinder block differential casing 14 are large hollow axle casings 34 and 35.

The two axle casings 34 and 35 may be secured directly to the chassis frame 46, for example, by bolts 47. The axle casing 35 is provided with double walls 48 to provide a jacket space in which is mounted a heat exchanging unit 49. The heat exchanging unit is provided with two sets of passages, one of which is connected by conduits 49a and 49b with the cooling system of the engine, and the other of which receives air from a conduit 50 with which is associated a fan 51 driven from the engine crankshaft and delivers the air to an outlet in the jacket. The conduit 50 draws air from a large air filter chamber 52 disposed in the cylinder block, and also disposed above said block is a chamber 53 for housing such units as the carburettor. This chamber may either communicate through the filter chamber with the atmosphere, or may be supplied with air drawn through the filter unit by the engine fan. Thus, the carburettor 54, ignition system 55 and other sensitive units may be fully protected from dirt and water. By arranging a suitably high level air inlet for the filter chamber the unit could operate while submerged. In the case where the engine is liquid cooled, the axle casing may be provided with comparatively large cooling surfaces in the form of fins, and the liquid is arranged to circulate over the inner surfaces of the casing and then through the liquid cooling system of the engine.

Instead of the axle casing being formed in two parts bolted one on either side of the cylinder block, a one-piece axle casing may be provided having a central compartment in which the engine unit is located.

I claim:

1. An internal combustion engine comprising a closed compartment, the walls of which form a unitary part of the body of the engine, a carburettor mounted in said compartment, and means for supplying air to said compartment, said air supply means having an air inlet positioned above the upper portion of the engine body.

2. An internal combustion engine comprising a closed compartment, the walls of which form a unitary part of the body of the engine, a carburettor and ignition system mounted in said compartment, and means for supplying air to said compartment, said air supply means having an air inlet positioned above the upper portion of the engine body.

3. An internal combustion engine comprising a closed compartment, the walls of which form a unitary part of the body of the engine, said closed compartment having an inlet opening, an air filter in said opening, a carburettor and ignition system mounted in said compartment, and means for drawing air through said filter into said compartment.

4. A driving unit comprising an internal combustion engine, an axle casing secured on each side of said engine, an axle in each casing driven from the engine shaft, a closed compartment, the walls of which form a unitary part of the body of the engine, a carburettor, and ignition system mounted in said compartment, a heat exchanger in one of said axle casings, a fan driven by said engine and having its low pressure side communicating with said compartment and its high pressure side communicating with said one axle casing, which compartment and casing are provided with inlets and outlets respectively.

5. A driving unit comprising an internal combustion engine, an axle casing secured on each side of said engine, an axle in each casing driven from the engine shaft, a closed compartment, the walls of which form a unitary part of the body of the engine, a carburettor, and ignition system mounted in said compartment, a heat exchanger in one of said axle casings, a fan driven by said engine and having its low pressure side communicating with said compartment and its high pressure side communicating with said one axle casing, which compartment and casing are provided with inlets and outlets respectively, and an air filter in said inlet openings.

PHILIP CONRAD VINCENT.

REFERENCES CITED

The following references are of record in the file of this patent:

UNITED STATES PATENTS

| Number | Name | Date |
|---|---|---|
| 1,190,777 | LaPorte | July 11, 1916 |
| 1,254,861 | Smeeth | Jan. 29, 1918 |
| 1,648,505 | Persu | Nov. 8, 1927 |
| 1,749,202 | Witry | Mar. 4, 1930 |
| 1,803,952 | Upton et al. | May 5, 1931 |
| 1,933,949 | Weber | Nov. 7, 1933 |
| 2,004,215 | Peterson | June 11, 1935 |
| 2,105,153 | Ledwinka | Jan. 11, 1938 |
| 2,143,889 | Ledwinka | Jan. 17, 1939 |
| 2,175,527 | Klavik | Oct. 10, 1939 |
| 2,218,265 | Nathan | Oct. 15, 1940 |
| 2,250,382 | Klavik | July 22, 1941 |

FOREIGN PATENTS

| Number | Country | Date |
|---|---|---|
| 441,547 | Great Britain | Jan. 16, 1936 |
| 874,346 | France | May 4, 1942 |